Nov. 9, 1926.

H. A. SHIELDS 1,605,991

CLOTH FOLDING, CUTTING, AND MARKING MACHINE

Filed Oct. 25, 1922    14 Sheets-Sheet 1

Inventor
Harry A. Shields
By Frank E. Liverance Jr.
Attorney

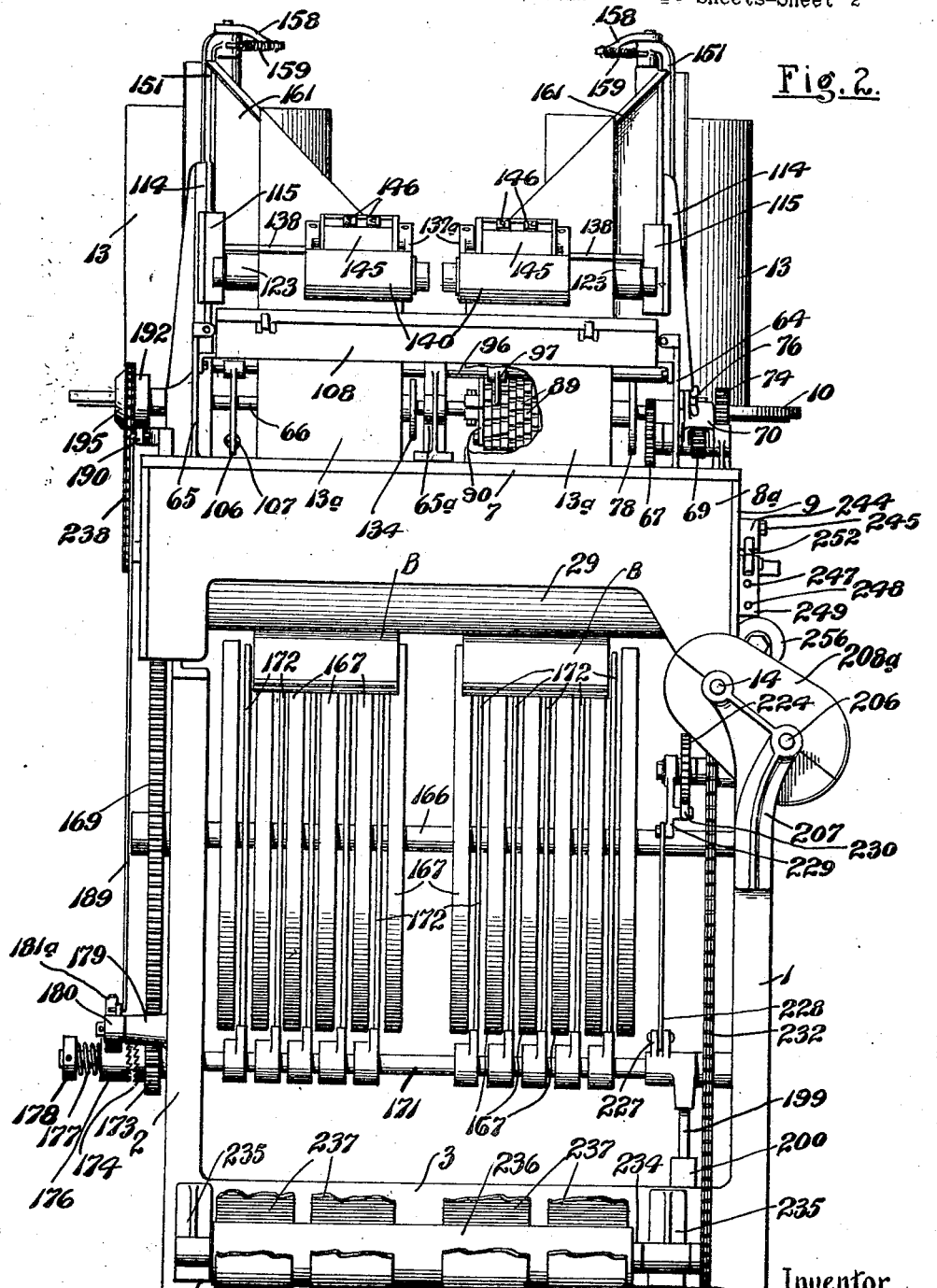

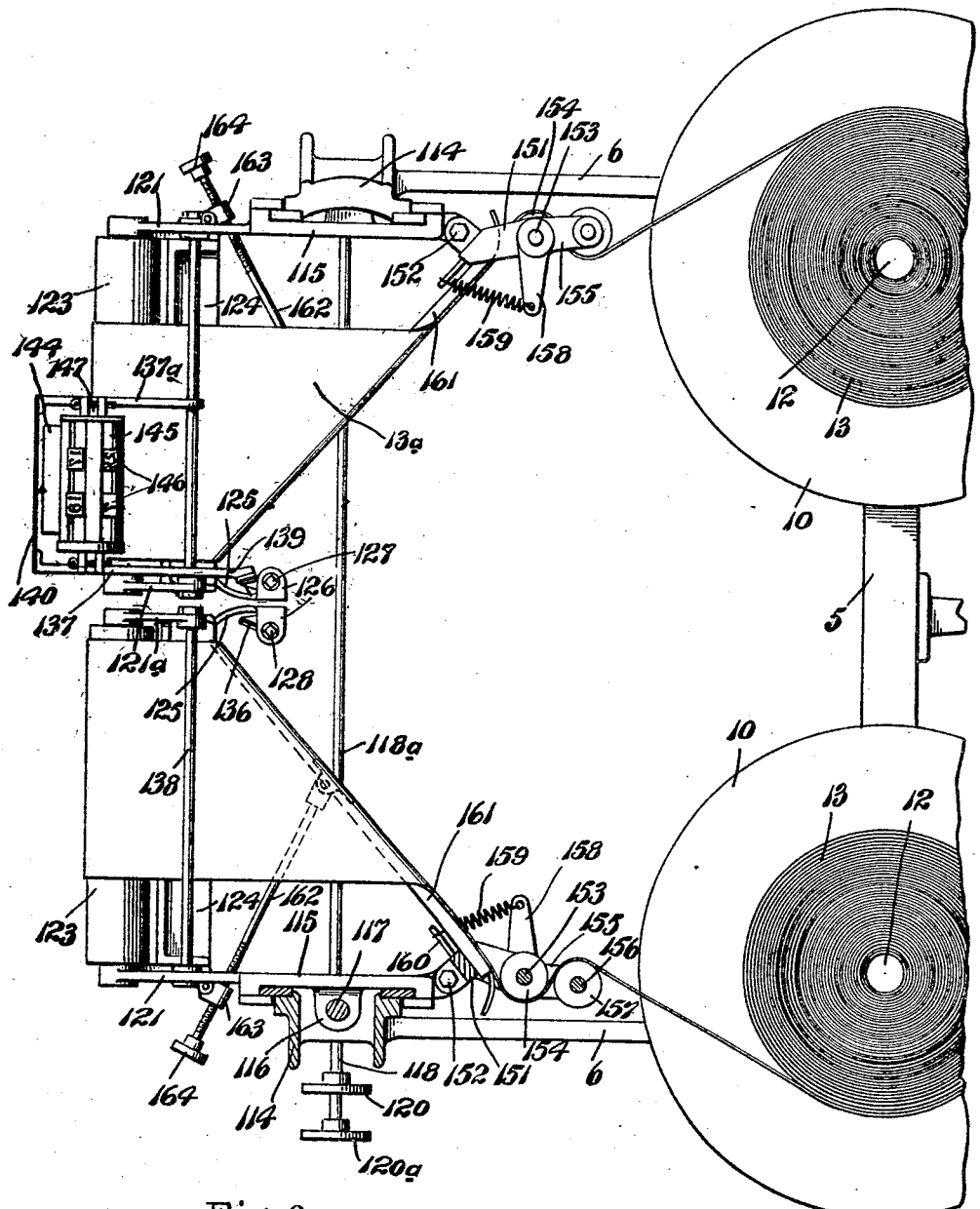

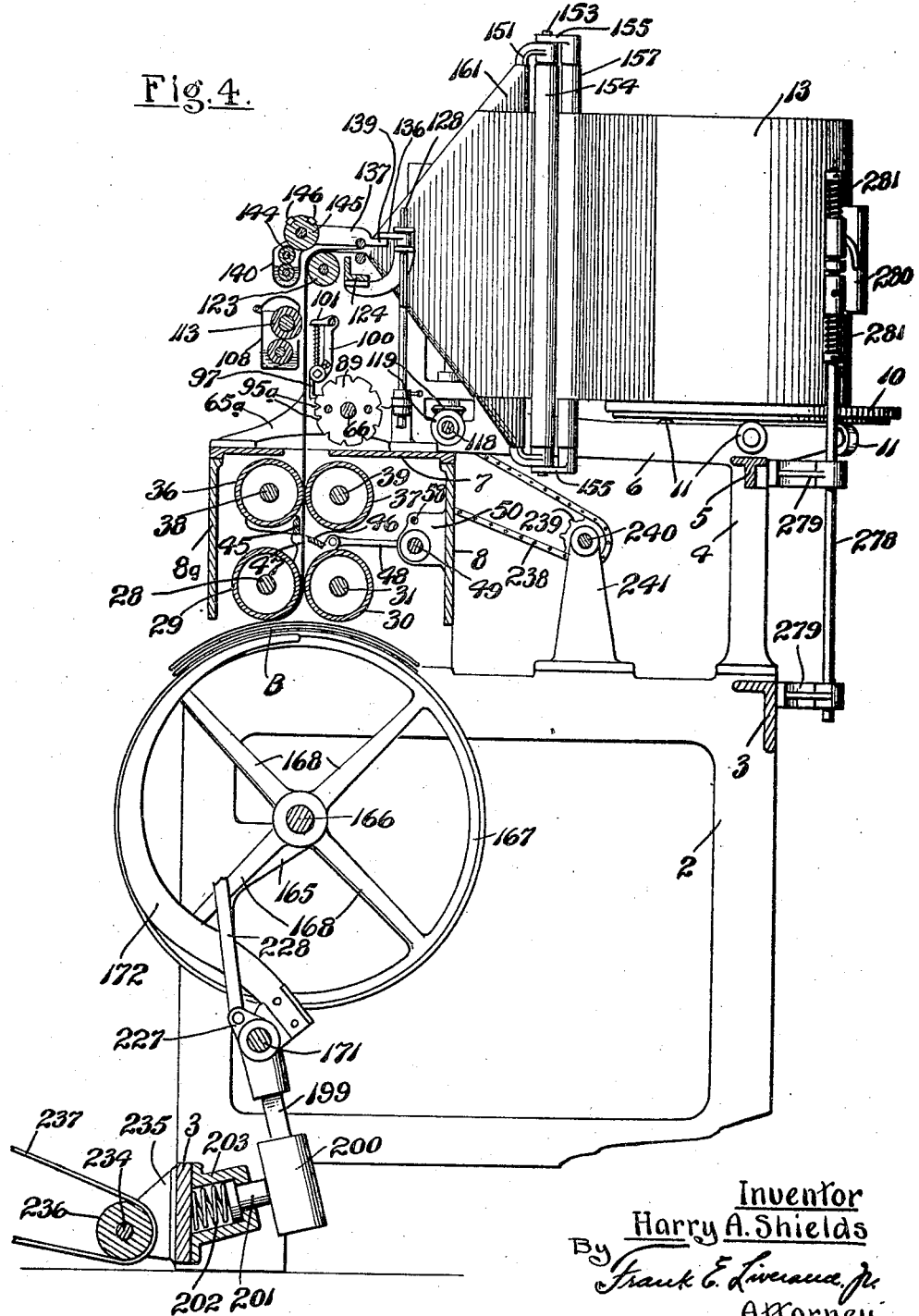

Nov. 9, 1926.
H. A. SHIELDS
1,605,991
CLOTH FOLDING, CUTTING, AND MARKING MACHINE
Filed Oct. 25, 1922    14 Sheets-Sheet 5
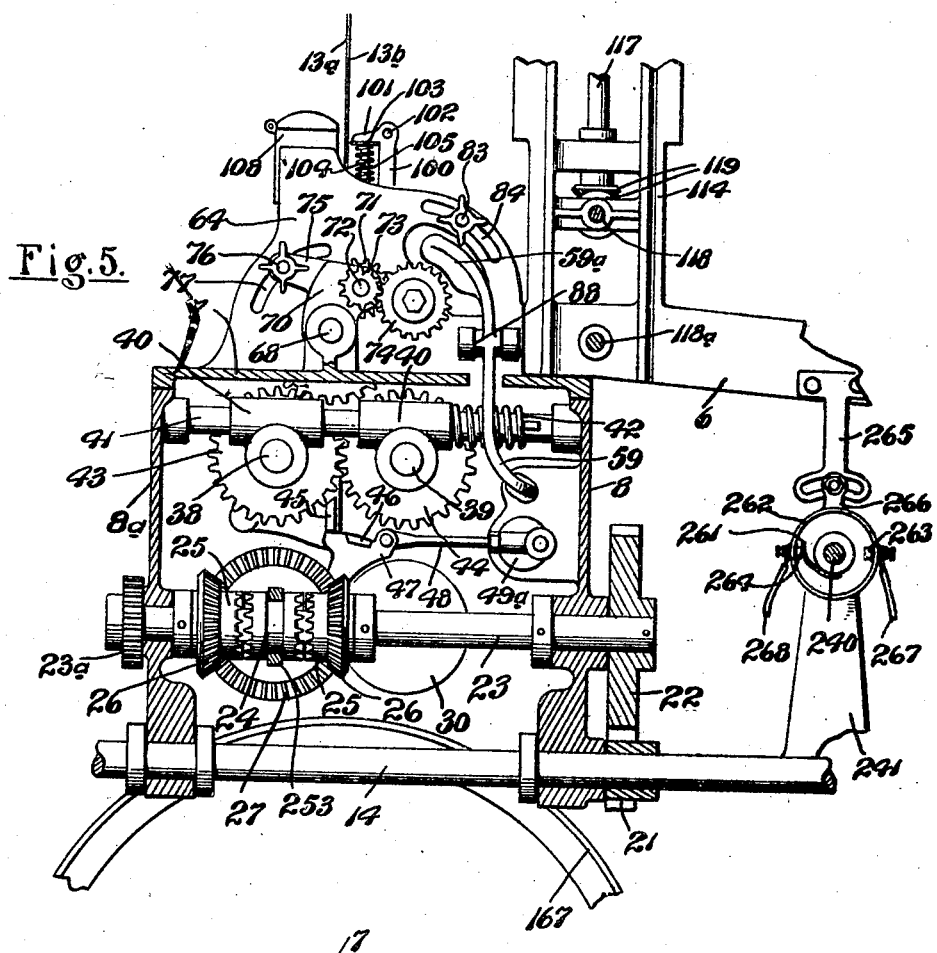
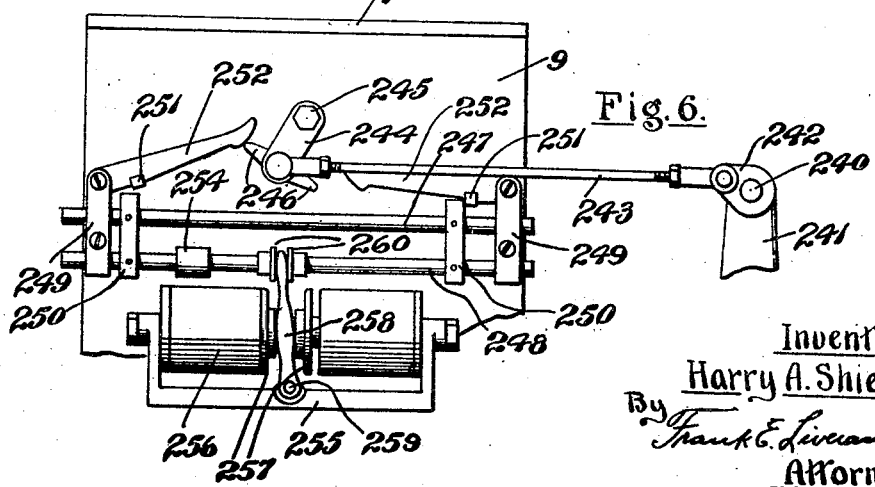
Inventor
Harry A. Shields
By Frank E. Liveaum, Jr.
Attorney Nov. 9, 1926.

H. A. SHIELDS 1,605,991

CLOTH FOLDING, CUTTING, AND MARKING MACHINE

Filed Oct. 25, 1922    14 Sheets-Sheet 6

Inventor
Harry A. Shields
By Frank E. Liverance, Jr.
Attorney.

Nov. 9, 1926.
H. A. SHIELDS
1,605,991
CLOTH FOLDING, CUTTING, AND MARKING MACHINE
Filed Oct. 25, 1922      14 Sheets-Sheet 7
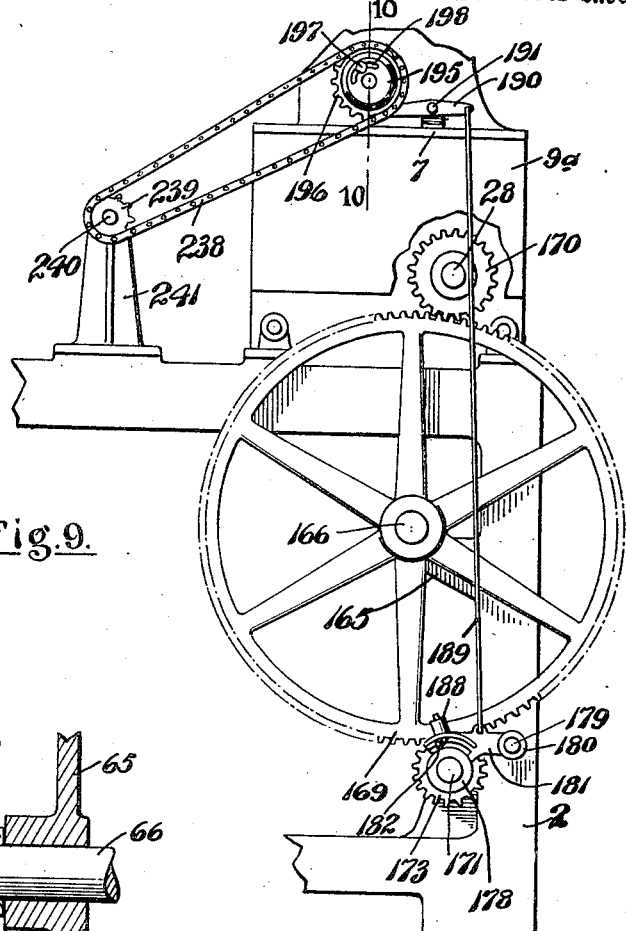
Fig. 9.
Fig. 10.
Fig. 11.
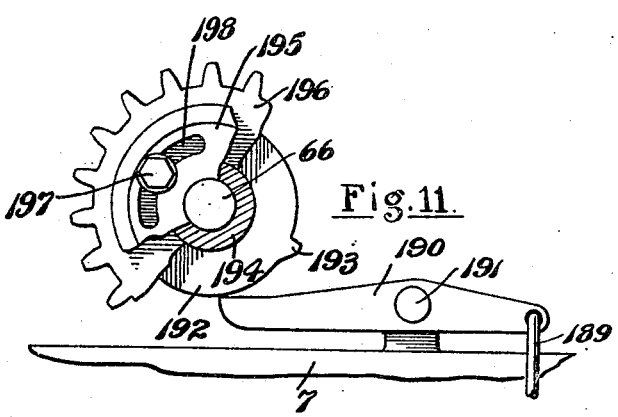
Inventor
Harry A. Shields
By Frank E. Liverance Jr.
Attorney.

Nov. 9, 1926.
H. A. SHIELDS
1,605,991
CLOTH FOLDING, CUTTING, AND MARKING MACHINE
Filed Oct. 25, 1922    14 Sheets-Sheet 8
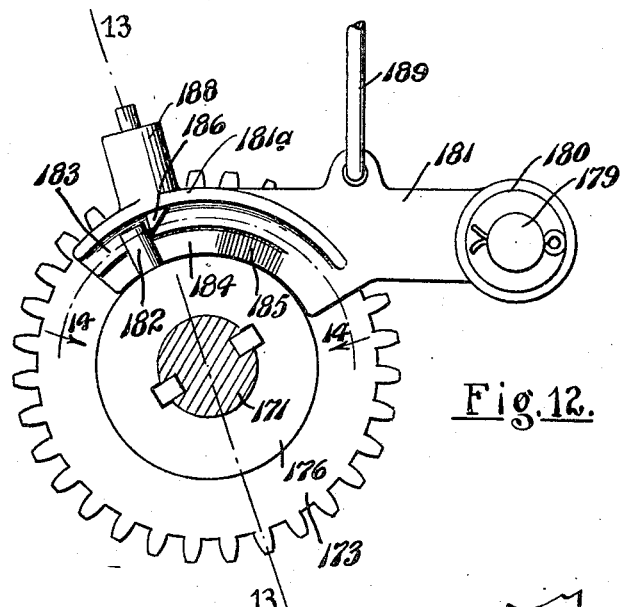
Fig. 12.
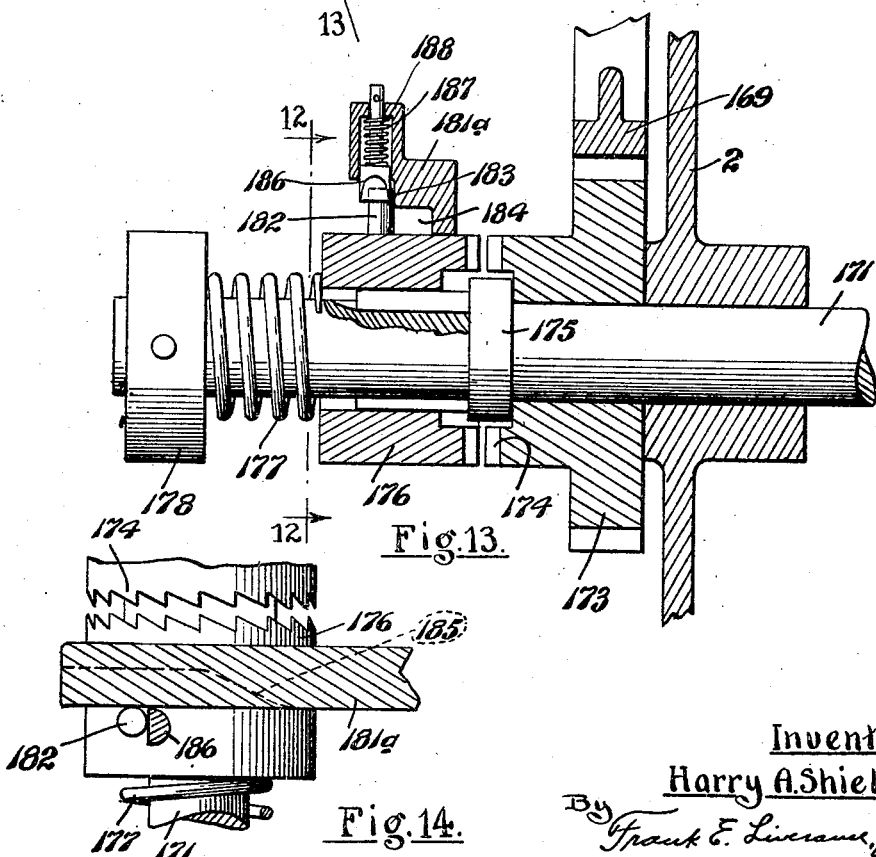
Fig. 13.
Fig. 14.
Inventor
Harry A. Shields
By Frank E. Liverance, Jr.
Attorney.

Nov. 9, 1926. 1,605,991
H. A. SHIELDS
CLOTH FOLDING, CUTTING, AND MARKING MACHINE
Filed Oct. 25, 1922 14 Sheets-Sheet 9
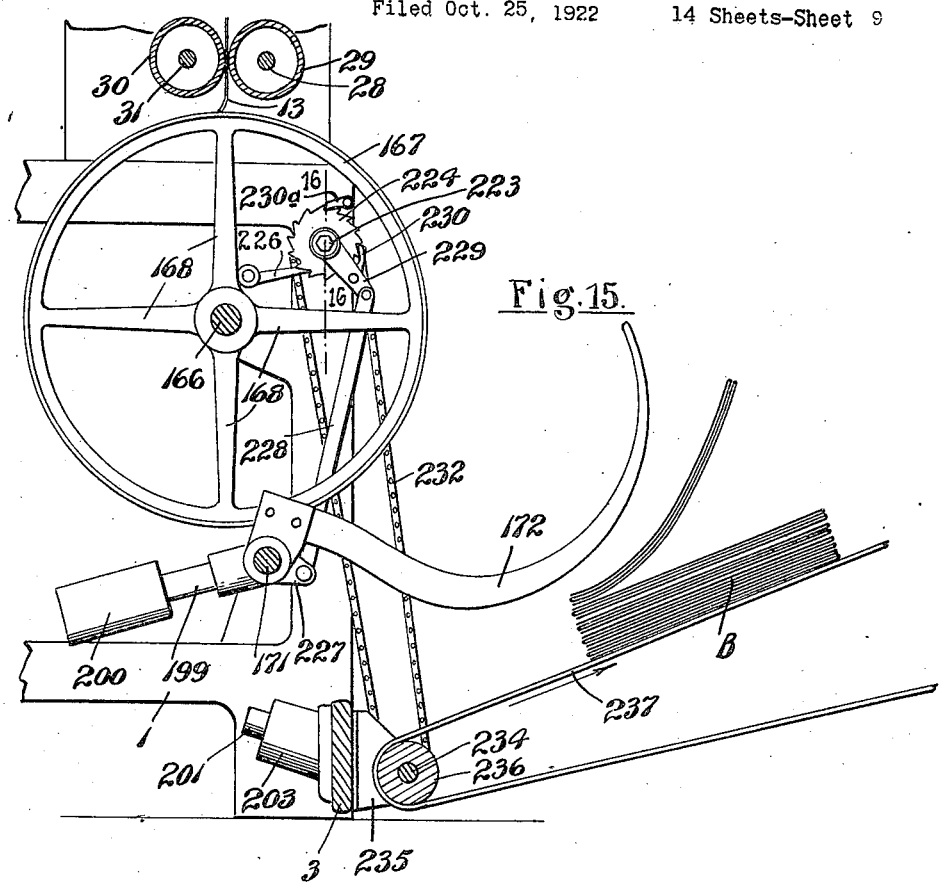
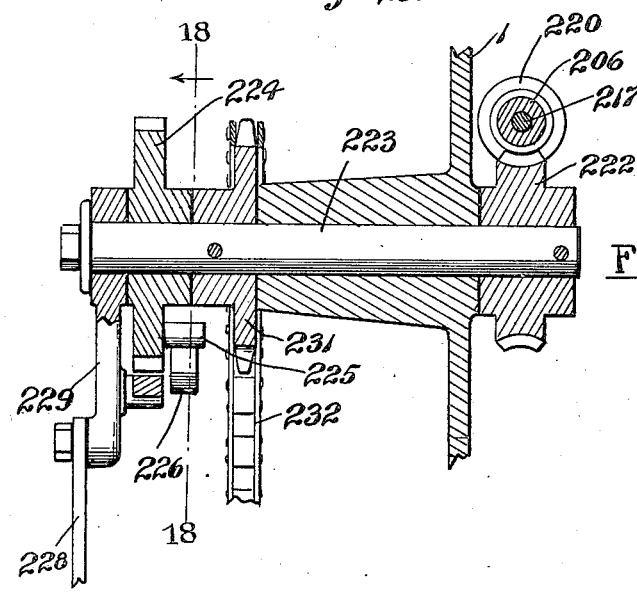
Inventor
Harry A. Shields
By Frank E. Liverance, Jr.
Attorney.

Nov. 9, 1926.
H. A. SHIELDS
1,605,991
CLOTH FOLDING, CUTTING, AND MARKING MACHINE
Filed Oct. 25, 1922 — 14 Sheets-Sheet 11
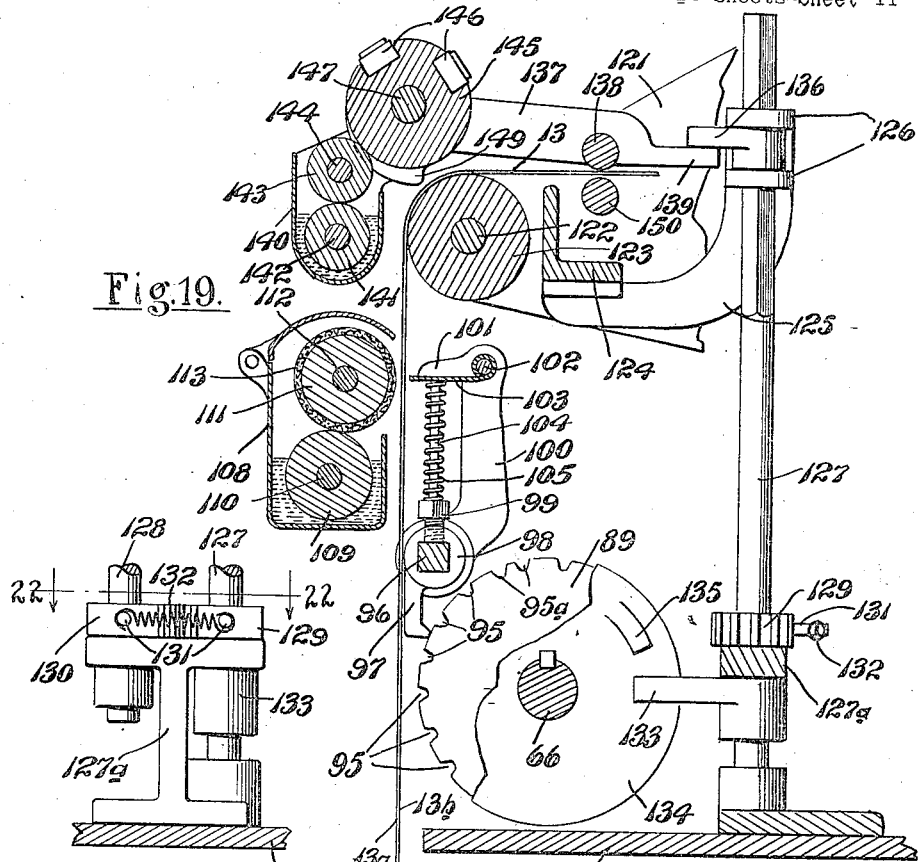
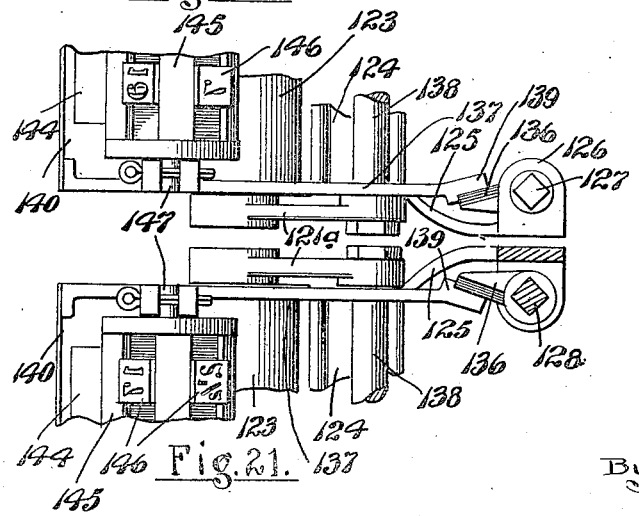
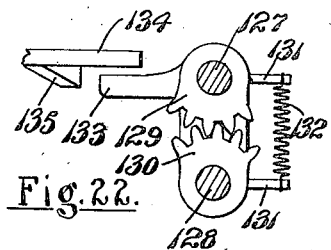
Inventor
Harry A. Shields
By Frank E. Liviano, Jr.
Attorney.

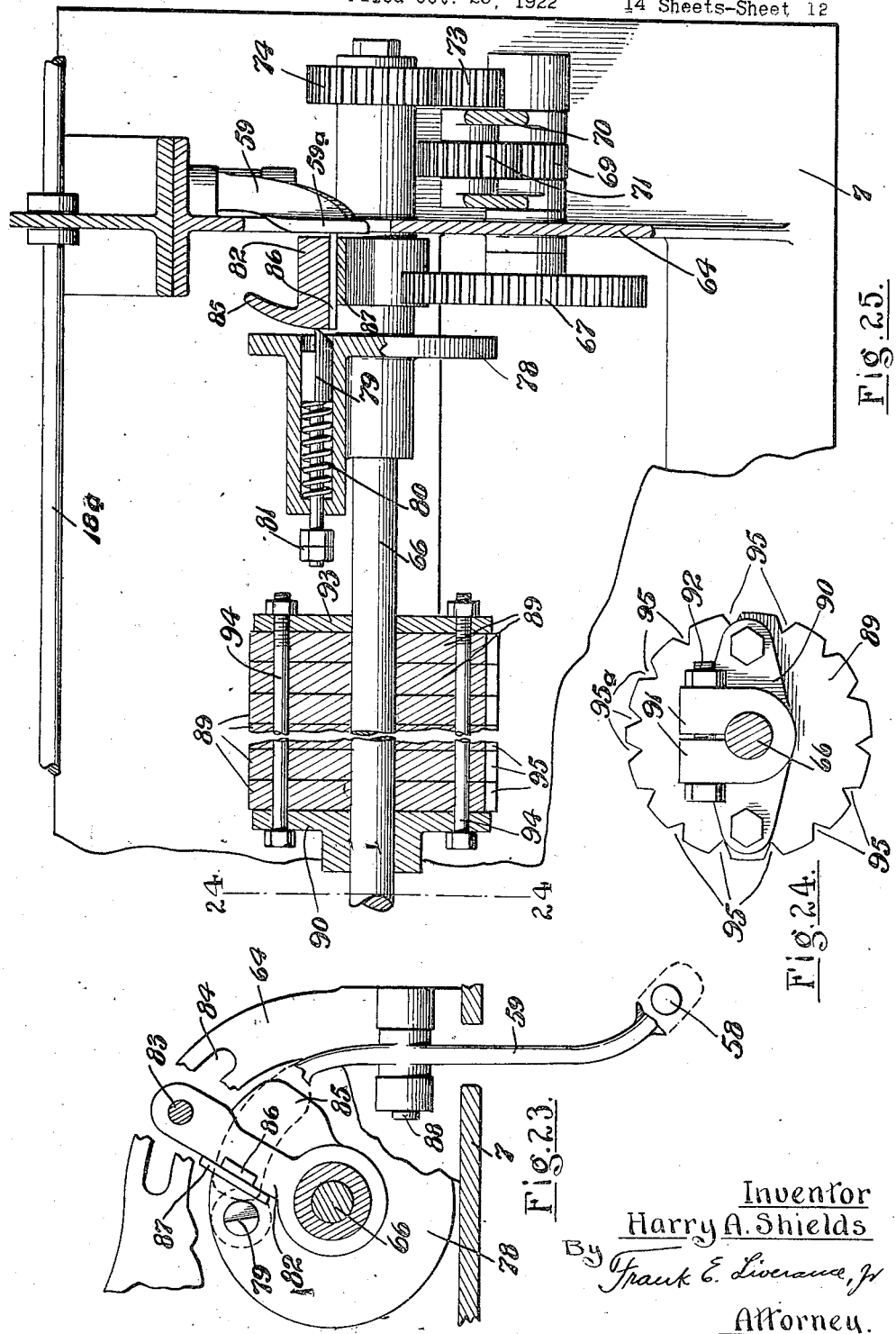

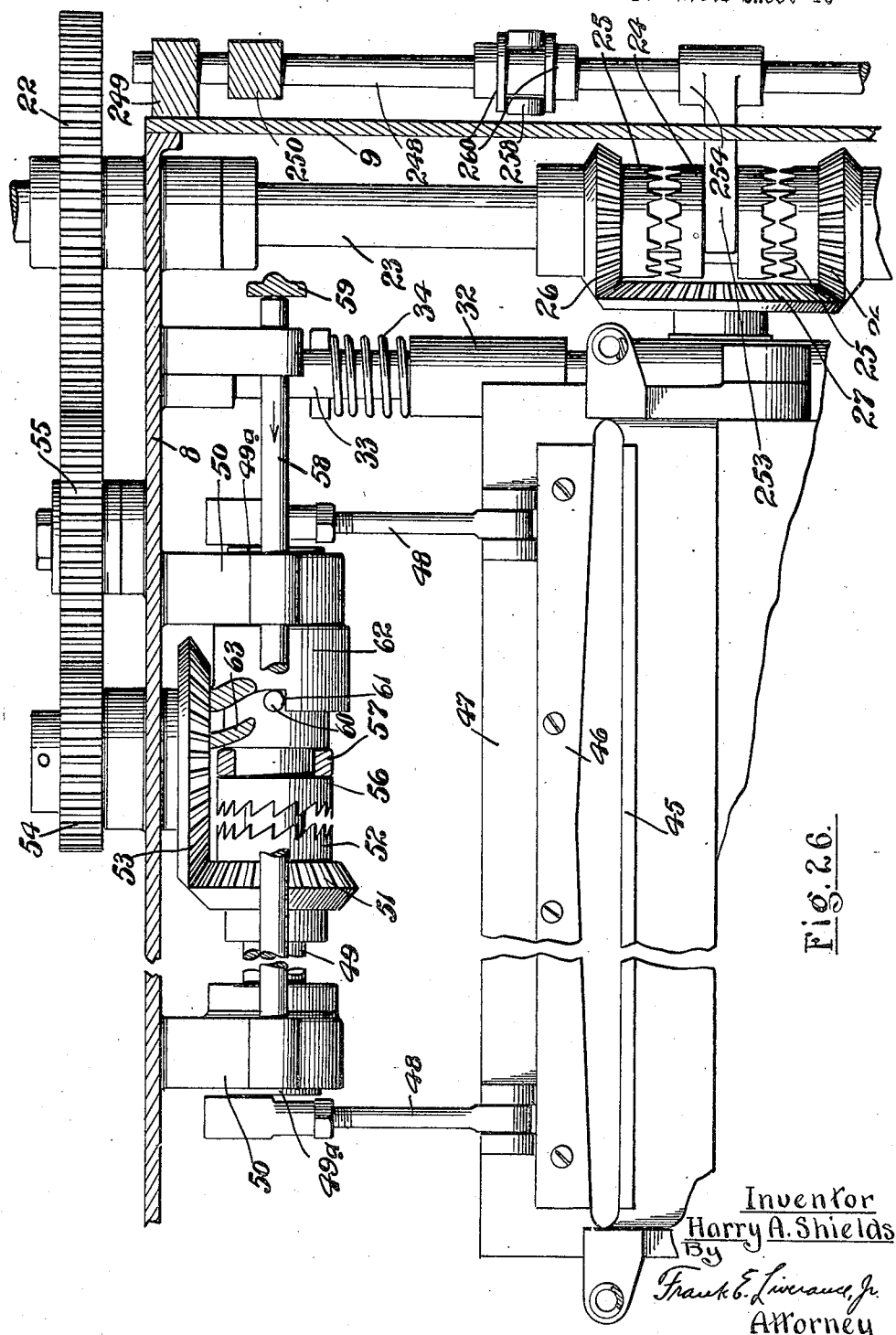

Nov. 9, 1926.　　　　　　　　　　　　　　　　　　1,605,991
H. A. SHIELDS
CLOTH FOLDING, CUTTING, AND MARKING MACHINE
Filed Oct. 25, 1922　　　14 Sheets-Sheet 14
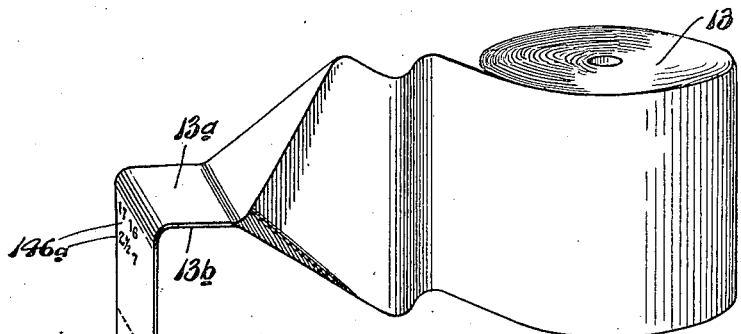
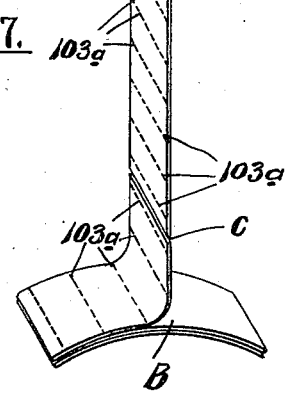
Fig. 27.
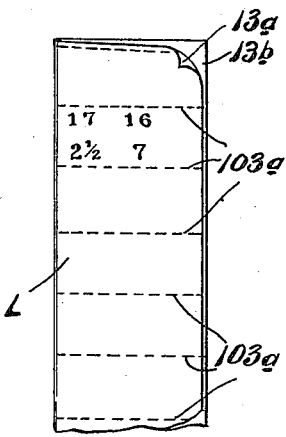
Fig. 29.
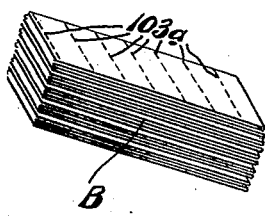
Fig. 28.
Inventor
Harry A. Shields
By Frank E. Liverance, Jr.
Attorney.

Patented Nov. 9, 1926.

1,605,991

UNITED STATES PATENT OFFICE.

HARRY A. SHIELDS, OF GRAND RAPIDS, MICHIGAN.

CLOTH FOLDING, CUTTING, AND MARKING MACHINE.

Application filed October 25, 1922. Serial No. 596,726.

This invention relates to a cloth folding, cutting and marking machine. The machine of this invention is of particular utility in preparing the cloth used and which is made into spring receiving pockets for the reception of coiled springs, a large number of which are used in making the cushion springs which are used in automobile seats, in chairs, davenports and other articles of household furniture. In the preparation of the cloth for this purpose, cloth is folded lengthwise, cut into the proper and required lengths and transversely marked on one side at least to indicate where the same is to be sewed transversely to make into spring receiving pockets, it being evident that such pockets as thus made will be closed at one end and open at the other for the insertion of the springs. The cloth comes to the machine in large rolls, and by the machine of this invention is folded lengthwise, transversely marked, cut into desired lengths, and each length is further marked with identifying characters to tell the depth of the pockets, the diameter of the springs going therein and other data having reference to the same, is folded into a compact form and delivered from the machine to a conveyer which, after the deposit of several of the folded lengths of marked cloth, conveys the same to any desired point where the several lengths may be tied together in a bundle to be later transferred to the sewing machines for sewing to make the pockets mentioned.

My invention has for its primary object and purpose, the provision of a machine capable of attaining the above noted ends satisfactorily, whereby the cloth may be handled very rapidly and prepared in great quantity for the sewing of the pockets and production greatly facilitated. A further object of the invention is to make a machine of this character wherein many different lengths and widths of cloth may be handled and different lengths and characters of cloth produced in the same machine for the many different types of springs used and made, relatively simple and easily operated adjustments therefor being provided in the construction. Still other objects of the invention are to provide a simple longitudinal folding arrangement for the cloth, complete and easily operated means for marking it, novel means for operating the receiving members on which the cut lengths of cloth are folded, and many other novel constructions and arrangements of parts for the production of a durable, practical quantity production machine of the type outlined, all of which will appear fully and in detail as understanding of the invention is had from the following descrpition, taken in connection with the accompanying drawings, in which, Fig. 1 is a side elevation of the machine made in accordance with my invention.

Fig. 2 is a front elevation thereof.

Fig. 3 is a plan with parts in section and other parts left out for clearness of disclosure.

Fig. 4 is a transverse vertical section through the machine.

Fig. 5 is an enlarged fragmentary transverse vertical section taken at one end of the cutting mechanism, other parts above the same being shown in elevation.

Fig. 6 is a fragmentary enlarged end elevation of the cutting mechanism casing and the reversing means employed which is mounted thereon.

Fig. 9 is a fragmentary side elevation of the machine, at the side thereof opposite to that shown in Fig. 1, illustrating the means used for controlling periodical throw-out of the folded lengths of cloth.

Fig. 10 is a vertical section on the plane of line 10—10 of Fig. 9.

Fig. 11 is a fragmentary end elevation with parts broken away and in section showing the automatic trip mechanism for said throw-out.

Fig. 12 is a section and end elevation on line 12—12 of Fig. 13, looking in the direction indicated by the arrows.

Fig. 13 is a longitudinal section on the plane of line 13—13, of Fig. 12.

Fig. 14 is a partial plan and horizontal section of the clutch and control means therefor shown in Figs. 12 and 13, the view being taken on curved line 14—14, of Fig. 12.

Fig. 15 is a fragmentary transverse vertical section through the lower front portion of the machine, illustrating the operation of the throw-out.

Fig. 16 is an enlarged vertical section on the plane of line 16—16, of Fig. 15.

Fig. 19 is an enlarged transverse vertical section through the marking mechaism.

Fig. 20 is a fragmentary rear elevation thereof showing the detail of the mounting used for two rock members of the construction.

Fig. 21 is a fragmentary plan view of the number marking means.

Fig. 22 is a horizontal section on line 22—22, of Fig. 20.

Fig. 23 is a fragmentary end elevation with parts broken away and shown in section, of the control means for governing the operation of the cutting knife in the cutting mechanism.

Fig. 24 is a vertical section on the plane of line 24—24, of Fig. 25.

Fig. 25 is an enlarged fragmentary plan and horizontal section showing the transverse marking cams, the shaft on which it is mounted and the mechanisms associated therewith.

Fig. 26 is an enlarged fragmentary horizontal section through the cutting and reversing mechanism of the machine.

Fig. 27 is a perspective view showing a roll of cloth and the operations through which it passes in going through the machine.

Fig. 28 is a perspective view of the folded and marked length of cloth as delivered from the machine, and Fig. 29 is an elevation of a length of the cloth unfolded and showing the markings thereon on one side.

Like reference characters refer to like parts in the different figures of the drawings.

Figure 1:
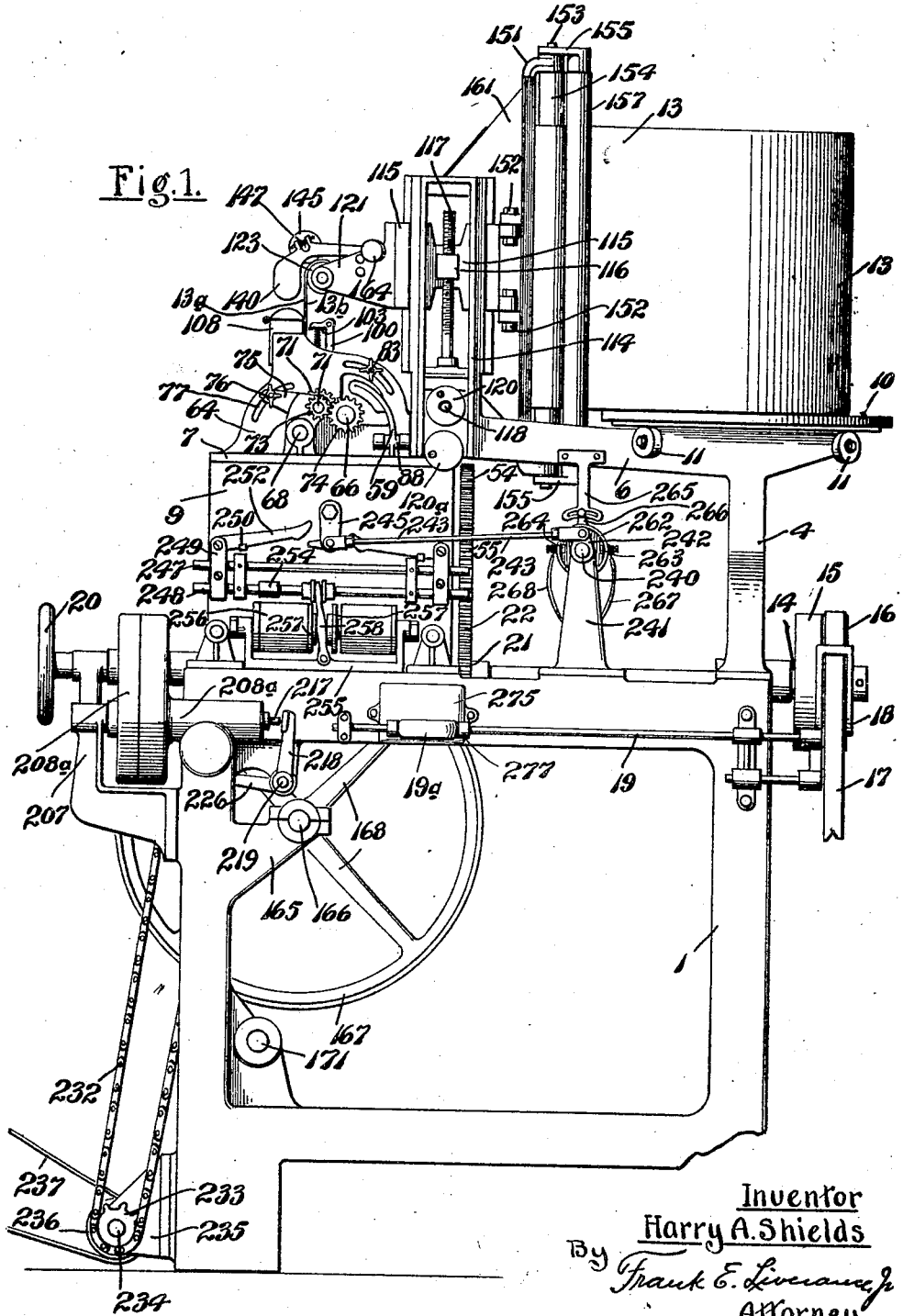

In the construction of the machine, a supporting frame is used, comprising ends 1 and 2 which are connected by cross bars 3, making the major portion of the lower support for the mechanism. Uprights 4 are connected to and extend upwardly from each side of the frame at the rear portions thereof, and are connected by a cross bar 5. At the upper end, each upright 4 is formed with a forwardly extending arm 6, these at their front ends coming above the upper side 7 of a casing or housing for the cutting mechanism, the said casing or housing being open at its lower side and completed by back 8, front 8ª, and ends 9 and 9ª, as shown. This casing or housing and the mechanism enclosed therein are substantially identical with that shown in my Patent No. 1,197,865, issued Sept. 12, 1916. A turn table 10 carried on rollers 11 mounted on the arm 6 at each side of the machine is used to carry the rolls of cloth, a spindle 12 extending upwardly from each table 10 over which the rolls 13 of the cloth are placed in vertical position.

At one side of the machine a shaft 14 is rotatably mounted in suitable bearings, at its rear end having fixed and loose pulleys 15 and 16 over which a belt 17, driven in any preferred manner may pass, being shiftable from one to the other by means of a belt shifter 18 operated by a rod 19 slidably mounted on the side 1 of the supporting frame, and having a handle 19ª for manual operation thereof. The shaft 14 is also manually operable by a hand wheel 20 fixed at its front end whenever such operation may be desired.

Figure 7:
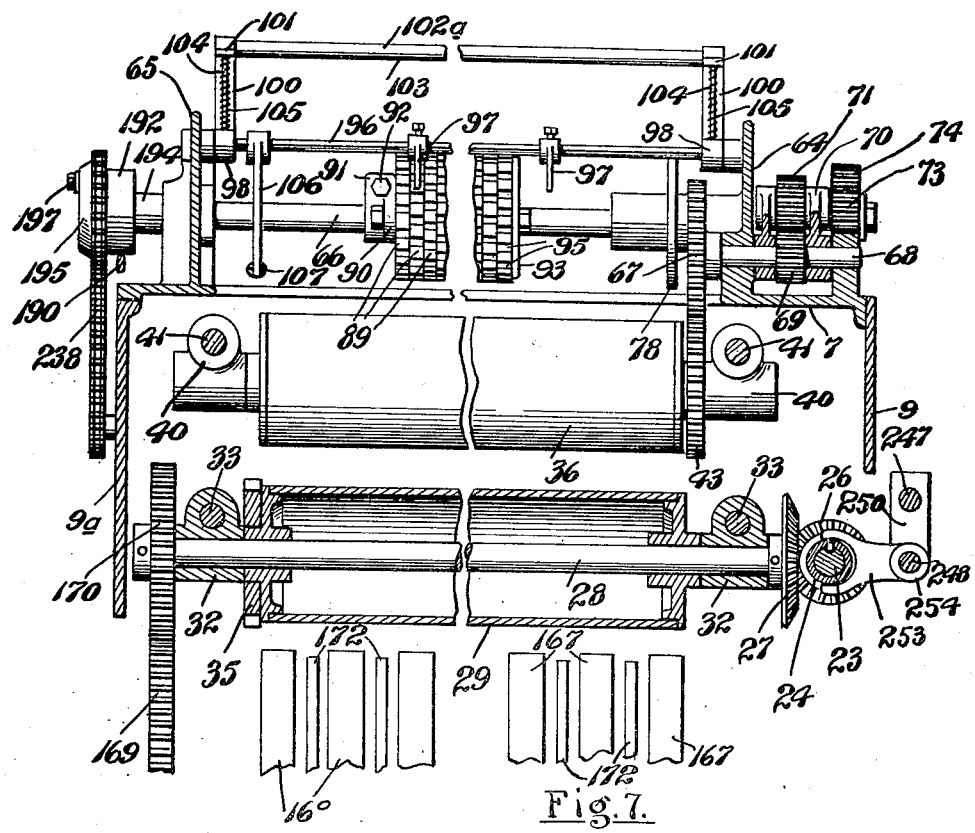
Fig. 7 is a fragmentary enlarged longitudinal section through the cutting mechanism and the transverse marking means mounted thereabove.

A pinion 21 is fixed to shaft 14 back of the back 8 of the casing and is in mesh with a gear 22 secured at the rear end of a shaft 23 which is rotatably mounted in and lies between the front and back of the casing near one end thereof. A two-faced clutch member 24 is splined on shaft 23, at each side of which a combined clutch and bevelled pinion, indicated at 25 and 26, respectively, are loosely mounted on shaft 23, the pinions 26 being in mesh with a bevelled gear 27 secured at one end of a shaft 28 which extends through the casing parallel to the front side 8ª thereof. A roller 29 is loosely mounted on shaft 28. Directly back of roller 29 a second roller 30 is positioned and mounted on a shaft 31. The ends of shafts 28 and 31 are carried in bearings 32 which in turn are carried on rods 33 extending between the rear and front sides 8 and 8ª of the casing, the bearings for the shaft 31 being freely slidable on the rods 33 and normally moved toward the bearings for the shaft 28 by coiled springs 34 (see Fig. 26), whereby roller 30 is pressed against the roller 29 by spring pressure. The rollers 29 and 30 have intermeshing gears 35 thereon at one end, as shown in Fig. 7 and as fully disclosed in my prior patent above noted.

Directly over the rollers 29 and 30, other similar rollers 36 and 37 mounted on shafts 38 and 39 are mounted, said shafts being carried in bearings 40 in turn carried on rods 41 paralleling and located over the rods 33. The bearings carrying shaft 39 are slidable on rods 41 and acted upon by springs 42, in a manner similar to the action of springs 34, previously described. Intermeshing gears 43 and 44 are secured to the ends of the upper rollers 36 and 37, as shown in Fig. 5, it being designed that all of the rollers shall be driven through suitable mechanism from the pinion 23ª on the front end of the shaft 23, such mechanism not being new in any way and fully set forth in the prior patent to which reference has been made, so that it need not be further described herein. The movement of the rollers is such that cloth entered thereto through the upper side 7 of the casing is continuously fed therethrough.

A knife 45 is positioned lengthwise of the rollers and between the same with which a movable knife 46 carried on a carriage 47 is adapted to cooperate to cut the cloth at intervals, rods 48 being connected to the movable carriage 47 and having connection at their other ends to cranks 49ª fixed on the ends of a shaft 49 mounted for rotation in brackets 50 which project forward from the rear side 8 of the casing. A bevelled pinion 51 is loosely mounted on the shaft 49 and is driven by a like gear 53 which is secured at the front end of a short shaft rotatably mounted in and extending through the back 8 of the casing, at its rear end having a gear 54 attached, which is driven from gear 22 on shaft 14 by an interposed idle gear 55 (see Fig. 26). A clutch member 52 is formed integral with pinion 51 and it is evident that when the machine is in operation, the combined gear and clutch member 51 and 52 is continuously driven at relatively high speed.

A coacting clutch member 56 is splined on the shaft 49 at one end of the clutch 52, with which a yoke 57 is connected, the yoke having attachment to an overhead rod 58 slidably mounted in the brackets 50. The rod 58 at its end is in contact with an operating lever 59 which when operated serves to connect the clutch members whereby shaft 49 is rotated and the knife 46 reciprocated under knife 45. The means of operating the lever 59 will be hereafter described.

A pin 60 projects from the member 56 and normally lies behind a shoulder 61 on a fixed member 62, the pin being guided in cam guides 63 to retract the clutch as the shaft 49 makes a single complete rotation, stopping the knife mechanism when the pin strikes shoulder 61, whereby one and only one rotation of the shaft 49 occurs.

On the upper side of the top 7 of the casing for the cloth cutting mechanism, upwardly extending supporting brackets 64 and 65 with an intermediate bracket 65ª, are provided, through which a shaft 66 passes, the same being rotatably mounted and driven continuously when the machine is in operation. A gear 67 is in mesh with the gear 43 on the roller 36, which gear is fixed on the inner end of a short shaft 68 mounted horizontally in the bracket 64 and carrying a pinion 69 between its ends. A yoke 70 is loosely mounted to turn on the shaft 68 and has a pinion 71 mounted on a short shaft 72 rotatably mounted and passing through the arms or sides of the yoke, at its outer free end carrying a change gear or pinion 73 which meshes with a change gear 74 fixed on the end of the shaft 66. The gears 73 and 74 may be changed so as to get different relative speeds of the shaft 66 with respect to the rotation speed of the roller 36, as is evident. An arm 75 extends from the yoke 70 and at its end is equipped with securing means 76, consisting of a bolt and nut, the bolt passing through a curved slot 77 in the bracket 64 concentric with the shaft 68 and having the same center of curvature, this being necessary due to the different positions which the yoke will take with different gears 73 and 74 secured on the ends of shafts 72 and 66. It is designed that the operation of the cutting knives shall take place once with each revolution of the shaft 66, and by giving said shaft different speeds of rotation with respect to the relatively constant speed of rotation of the rollers 29, 30, 36 and 37, it is evident that different lengths of cloth may be run through before the cutting thereof takes place, the lengths desired being determined by the relation of the change gears 73 and 74.

To operate the lever 59 which controls the time of operation of the cutting knives, a disk 78 is secured to the shaft 66 near the bracket 64, on which a plunger 79 is mounted for lengthwise movement, normally being forced outwardly by a spring 80 until stopped by the nuts 81 on the inner reduced end of the plunger coming into engagement with the end of the sleeve in said plunger is mounted (see Fig. 25). A member 82 is loosely mounted on shaft 66, extending therefrom on the inner side of bracket 64 and securing means 83 consisting of a bolt and nut are associated therewith, the bolt passing through the outer end of the member 82 and through a curved slot 84 in the bracket 64 giving the member a limited adjustment. A cam 85 is formed integral with the member 82 and formed so that when the plunger in its outer position comes thereto on rotation of the disk 78, the end of the plunger comes back of the cam and the plunger is forced back against the force of the spring 80 to the position shown in Fig. 25. A bar 86 is slidably mounted on the side of the member 82, being held in a retaining guide 87, and when the end of the plunger passes from the cam 85 it engages with the end of the bar 86 and forces it forward. Lever 59 is pivotally mounted between its ends at 88 on the bracket 64 and its upper end lies directly in front of the bar 86 whereby on said movement of the bar, as described, the lever is turned about its pivot, acting on the rod 58 and setting the cutting mechanism in motion. By the time the shaft 49 has made its one revolution, the plunger 79 has passed by the bar 86 which will not be again operated until shaft 66 has again made a complete revolution.

On the shaft 66 a plurality of disks 89 are placed, one of the end disks of the number bearing against a bar 90 integral with which is a split collar having separated arms 91 through which a bolt 92 passes to fix the bar with respect to the shaft (see Fig. 24). The other end disk of the series bears against a circular plate 93. Bolts 94 pass through the ends of the bar 90 and through the disks and plate, having nuts at their ends whereby the bar, disks and plate are securely bound together. Inasmuch as the machine is designed to take care of and mark two rolls of cloth simultaneously, there are two sets or series of the disks on the shaft 66 identical in construction and secured in place in the same way.

A plurality of notches 95 are cut in spaced relation in the edges of the disks 89, the different disks having the notches differently spaced from each other except for two notches 95$^a$ in each disk which are located relatively close together and which, in each disk, are located the same distance apart. Except for said notches 95$^a$, the other notches in any one disk are equally spaced from each other and in different disks, the distances apart are different for the notches 95.

A rod 96, square in cross section is located above and in front of the shaft 66 on which two dogs 97 are adjustably mounted being held in any position to which adjusted by set screws. One of said dogs is associated with each series of disks 89 and each at its lower end is formed with a rearwardly turned point adapted to enter the notches 95 and 95$^a$ in the disks as the same come thereto. Each dog depends from a collar 98 through which the rod 96 passes freely, set screws 99 being used to hold the collars and attached dogs in any position to which adjusted.

Two arms 100 are secured at their lower ends to the rod 96 extending upwardly and slightly to the rear from the rod, each at its upper end being formed with a forwardly extending lip 101. A rod 102 connects the upper ends of the arms 100 on which a sheet metal plate 103 is pivotally mounted, the same extending forward and at its ends lying under the lips 102. A vertical rod 104 extends upwardly from the lower portion of each arm 100 and at its upper end is connected to a lip 101, passing through the plate 103, and springs 105 are disposed under the plate around the rods 104, serving to normally hold the plate in upper position. This plate 103 at its forward edge is notched for its entire length. An arm 106 is connected to and extends downwardly from bar 96 and at its lower end a spring 107 is connected thereto, the tendency of which is to rock rod 96 in one direction so that when the lower ends of dogs 97 enter the notches 95 and 95$^a$, the plate 103 is pressed forwardly and against the back of the cloth passing in front thereof as will later appear.

A tank 108 for carrying ink or similar marking fluid is located horizontally between the brackets 64, 65 and 65$^a$ in front of the assembly just described, in which a roller 109 on a shaft 110 is positioned to partly immerse in the ink. A second roller 111 on a shaft 112 and covered with fabric 113 for ink absorption is mounted above the roller 109, ink transferring from the lower roller to the fabric, as is evident. The cloth passing between the forward edge of the notched plate 103 and the fabric covered roller, is pressed against the fabric whenever the plate is moved forward and the cloth printed transversely as indicated at 103$^a$ in equally spaced apart intervals except when the notches 95$^a$ are entered by the dogs 97, the markings are closer together. It is between these markings that the cut in the cloth, indicated at C in Fig. 27, is to take place.

At the front end of each arm 6 an integral upwardly extending guide 114 is formed in which blocks 115 are slidably mounted, each block having a threaded lug 116 thereon through which a threaded rod 117 passes. Said rods 117 are designed to be turned by horizontal cross shafts 118 and 118$^a$, through bevelled gear connections therewith indicated at 119. The shafts 118 are equipped with operating cranks 120 and 120$^a$ at one end for manual operation, it being evident that the blocks 115 may be raised or lowered in the guides 114 as desired, the intent being that these blocks shall be disposed substantially midway between the upper and lower ends of the rolls of cloth 13 which may vary in height An arm 121 extends forward from each block 115 and shafts 122 with rollers 123 thereon are rotatably mounted at the front ends of the arms, extending toward each other and supported at their inner adjacent ends by arms 121$^a$ projecting from an angularly shaped bar 124 which lies back of and under the rollers 123 and is connected one at each arm 121. At the inner end of each bar 124, an arm 125 is secured extending to the rear and upwardly and terminating in upper and lower horizontally located ears 126 which in the two arms are slidably mounted on two rock shafts 127 and 128 positioned vertically and in parallel relation to each other. The rock shafts at their lower ends are mounted on a bracket support 127$^a$, as shown in Fig. 20, the shaft 127 extending below the shaft 128 as shown. Two members 129 and 130 having interengaging gear teeth at one side are attached to the respective shafts 127 and 128 with pins 131 extending from said members to which the ends of a tension spring 132 are connected normally tending to rotate the rock shafts in opposite directions (see Fig. 22). The shaft 127 is equipped with an arm 133 near its lower end which extends forward to lie alongside of a disk 134 keyed on the shaft 66. A cam lug 135 projects laterally from one side of the disk and in its movement rides against the arm 133 serving to rock the shaft 127 to which it is connected and simultaneously rock the other shaft 128 through the gearing connection between them, the shafts returning to original position as soon as the lug 135 passes by the arm 133 under the tension of spring 132.

Each of the shafts 127 and 128 is equipped with a latch arm 136 at its upper squared portion, lying between the ears 126 and sliding therewith in the adjustment of the blocks 115 and connected parts on the guides 114. A frame having spaced apart sides 137 and 137$^a$ is pivotally mounted on a rod 138 disposed between the arms 121 and 121$^a$, the inner ends of the two sides 137 being extended to the rear to make projections 139 adapted to pass under the latch arms 136.

The two frames at their fronts are completed by an ink carrying tank 140 lying horizontally between the front ends of the arms 137 and 137$^a$. A roller 141 on a shaft 142 is mounted in each tank to immerse partly in the ink therein, against which roller a second transfer roller 143 on a shaft 144 bears a third roller 145 having longitudinal grooves to receive marking blocks 146 is mounted on a shaft 147 above the transfer roller. The blocks 146 carrying indicating characters which are supplied with ink on bearing against the transfer roller and transmit it to the cloth passing over the roller 123 at periodic intervals as will now be outlined.

With the ends 139 of sides 137 under the latch arms 136 the marking roller 145 is elevated above the cloth passing thereunder. When the lug 135 operates the arm 133 outward, the rocking movement of shafts 127 and 128 moves latch arms 136 outwardly releasing the frames on which the marking rollers are mounted so that the rollers drop into contact with the cloth and are driven frictionally thereby, turning the rollers and bring the marking characters on blocks 146 against the cloth. A cam 149 extends from the roller 145 and in the turning of said roller 145, this cam bears against the cloth over roller 123, after the marking has been accomplished, thereby elevating roller 145 and the front end of the frame carrying it, with a consequent depression of the end 139, so that when the rock shafts 127 and 128 are released and return to original position, the latch arms 136 pass over the ends 139, the marking rollers being elevated until a succeeding revolution of shaft 66 occurs. The cloth passes under the rods 138 and over other rods 150 located under and in parallel relation to said rods 138, as shown in Fig. 19.

Before the cloth comes to this stage of the machine it is folded lengthwise or doubled on itself, and changed from a vertical position to horizontal so as to pass between the rods 138 and 150 and over the rollers 123. To accomplish this, the following mechanism is used at each side of the machine for the two rolls of cloth 13: A bar 151 is positioned vertically at the rear side of each block 115 and pivotally connected thereto at 152, the upper and lower ends of the bar 151 being turned to the rear and a vertical shaft 153 with a roller 154 thereon rotatably mounted thereon. Arms 155 are pivotally mounted at each end of the shaft 153, extending to the rear and a shaft 156 with a roller 157 thereon is vertically mounted between the rear ends of said arms 155. Other arms 158 extend inwardly at the ends of the arms 155 where mounted on the shaft 153, making bell-crank levers therewith, to which springs 159 are connected at one end, at their other ends being connected to pins 160 on the bars 151. The cloth 13 passes from the rolls on spindles 12 to one side of the rollers 157 and then to the other side of the rollers 154, being tensioned by the action of the springs 159. Folding guides 161 are connected to the bars 151 and extend inwardly and forwardly toward each other over which the cloth is carried, being folded at its middle longitudinally and changed in position to the horizontal, passing to the rollers 123, the upper fold 13$^a$ being on the upper side and the lower fold 13$^b$ on the lower side. It is the upper outer side 13$^a$ on which the markings are made as previously described. A rod 162 is connected at its inner end pivotally to each folding guide 161 and has a rotatable mount, at its outer portion being screw threaded and passing through a nut 163 pivotally connected to the arm 121 and having an operating head 164 at its outer end for turning manually whereby adjustment of the folding guides is readily had.

Two arms 165 are formed integral with and extend to the rear from the front vertical members of the side frames 1 and 2 of the supporting frame, in suitable bearings on which a cross shaft 166 is rotatably mounted. On the shaft 166 between the sides 1 and 2, a plurality of spaced apart wheels are mounted having rims 167 and spokes 168, the inner ends of which meet in hubs through which the shaft 166 passes. At one end of the shaft 166 a large gear 169 is secured, the same being in mesh with a gear 170 fixed on the end of the reversible shaft 28. With the operation of the machine, the reversal of movement of shaft 28 causes a corresponding reversal of movement of the shaft 166 and attached wheels. The rims 167 of said wheels come nearly to the lower side of the under rollers 29 and 30 in the cloth cutting mechanism and as the cloth is delivered therefrom, passing to the said wheels, it is folded back and forth thereon into a compact bundle, indicated at B.

A shaft 171 is rotatably mounted below the said wheels adjacent the front side of the machine on which a plurality of curved throw-out fingers 172 are fixed, so as to pass between the successive wheel rims 167. Normally said fingers are in the position shown in Fig. 4, lying within the outer limits of the wheel rims. A gear 173 is loosely mounted at one end of the shaft 171 (see Fig. 13), integrally formed with which is a clutch member 174, a collar 175 pinned to the shaft holding the gear and clutch member against the side 2 of the frame. Gear 173 being in mesh with the gear 169, as shown, is driven thereby back and forth continuously with the reversing movement of the said gear 169.

On the shaft 171 beyond the clutch 174, a collar 176 is keyed for sliding movement, its face next to the clutch 174 being formed as a coacting clutch member to join therewith. A spring 177 around the shaft between the collar 176 and a fixed collar 178 on the shaft normally tends to force the clutch members into engagement. This engagement occurs only at stated intervals, however, the clutch on collar 176 being held out of engagement, released periodically, and then withdrawn to inoperative position by means of the following mechanism:

A stationary post 179 projects laterally from the side 2 on which a sleeve 180 is loosely mounted, from which an arm 181 extends over the collar 176, normally lying thereagainst and having a head 181ᵃ to conform to the collar and which is formed with a shoulder 183 behind which a pin 182 extending from the collar may engage to hold the collar and its clutch in inoperative position. If the arm 181 is lifted so as to disconnect from the pin 182, the collar is freed for movement to clutch engaging position whereupon it is evident that the shaft 171 will be turned and the fingers 172 thrown outward, as shown in Fig. 15, carrying with them any folded length of cloth B which has been deposited on the rims 167 of the receiving wheels. It is designed that the throw-out of the fingers shall occur as the shaft 166 and attached wheels are turning backward, the gear 169 turning the gear 173 and connected shaft in the opposite direction. As will later appear, the head 181ᵃ on the end of arm 181, during this operation is lifted, and the pin 182 rides in the recess 184 therefor under the shoulder part 183, which recess at one end gradually narrows, having a cam end portion 185 against which the pin 182 rides so that the collar is withdrawn and the clutch members disconnected automatically as the fingers approach their outermost position. On return of the fingers to original position the pin 182 rides over a projecting dog 186, spring actuated by spring 187 housed in a housing 188 cast integral with the head 181ᵃ, the dog returning to original position after the pin has passed by, and serving to positively lock the fingers from any accidental outward movement until the arm 181 is lifted automatically in the operation of the machine.

To accomplish this automatic lifting, a rod 189 is attached at its lower end to the arm 181 at its upper end has connection to one end of a lever 190 pivotally mounted between its ends at 191 to a projection on the top 7 of the cutting mechanism casing (see Figs. 9 and 11). On the end of the shaft 66 a cam member 192 is secured against which the free end of lever 191 bears, the member 192 having a projecting lug 193 which rides against the end of the lever 190, tilting the same and lifting rod 189 and the attached arm 181. In mounting the cam member 192 on the end of shaft 66, it is placed around a sleeve 194 fixed on the end of the shaft, said sleeve having an enlarged head 195 with a sprocket wheel 196 located between the head and said cam member. A bolt 197 passes through a curved slot 198 in the head 195 and into the member 192 whereby all of the parts can be securely bound together, or on loosening the bolt or screw 197, the member 192 and gear 196 may be adjusted to different positions for accurate timing of the operation of lever 190. When the shaft 171 with attached throw-out fingers 172 is released from the driving connection with gear 173 and clutch 174, with the fingers in outer position, as shown in Fig. 15, the shaft is turned back and the fingers carried to between the rims 167 of the wheels on shaft 166 through a counter-weight 200 fixed at the end of a rod 199 attached to and rocked with shaft 171. In the falling of the weight it strikes against a shock absorbing pin 201, held outwardly by a spring 202, in a housing 203 attached to the rear side of the lower cross bar 3 of the frame of the machine. One of these shock absorbing members may be attached at each end of the bar 3, and two weights 200 used to counterbalance the fingers and return them to original position.

Figure 17:
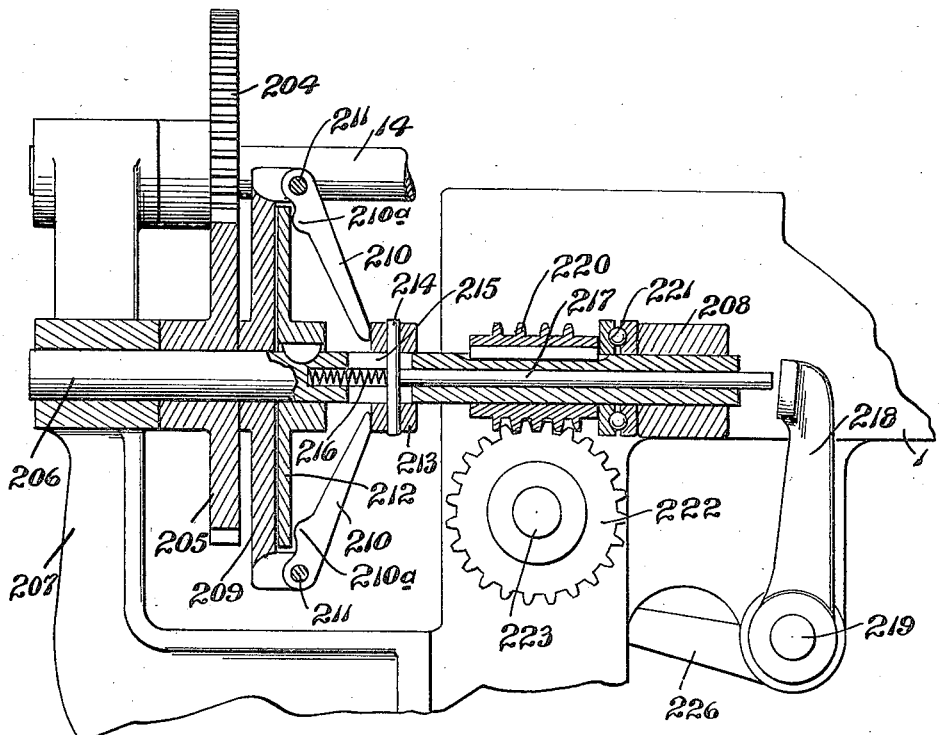
Fig. 17 is a vertical section through the clutch and drive mechanism for operating the conveyer for the thrown-out folded lengths of cloth.

The fingers 172 throw out the folded lengths of marked cloth to the front of the machine and on to a conveyor which at periodic intervals is automatically operated to carry the several folded lengths to any convenient position for tying. In this construction of the conveyer and the operating means therefor, a gear 204 is keyed to the shaft 14 near its front end, meshing with a second gear 205 loosely mounted on a shaft 206 which is rotatably mounted at its ends in brackets 207 and 208 attached to the side 1 of the frame of the machine, as shown in Fig. 17. Directly back of the gear 205, a disk 209 is loosely mounted on shaft 206, at the edges of which at spaced intervals inwardly and rearwardly extending fingers 210 are pivotally mounted at 211, passing back of a second disk 212 which is splined on the shaft 206 and rotates continuously therewith. The fingers 210 are formed with projections 210$^a$ which may bear against the disk 212 to force the disk 212 against the loose disk 209 and cause it to rotate on moving the fingers toward the splined disk. The ends of the fingers lie directly in front of a collar 213 slidably mounted on the shaft 206, a pin 214 passing through the collar and through a longitudinal slot 215 in shaft 206, a spring 216 acting on the pin 214 so as to normally move the collar away from the ends of the fingers. Shaft 206 is bored centrally from its rear end for a considerable portion of its length, the spring 216 being seated at the inner end of the opening made, and a rod 217 is loosely mounted in said opening, one end bearing against the pin 214, and the outer end extending beyond the end of the shaft 206 and coming in front of an arm 218 which at its lower end is connected to a shaft 219 rotatably mounted on the frame 1. A worm 220 is fixed on the shaft 206, a thrust bearing 221 being interposed between one end of the worm and the bracket 208, and a worm wheel 222 on a shaft 223 rotatably mounted on the frame side 1 meshes with the worm as shown in Fig. 17.

Figure 18:
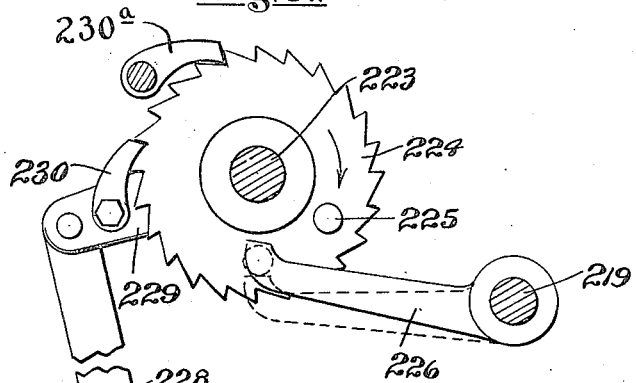
Fig. 18 is a vertical section and elevation on line 18—18 of Fig. 16 looking in the direction indicated.

On the opposite end of the shaft 223 (see Figs. 16 and 18), a ratchet wheel 224 is loosely mounted from which at one side a pin 225 extends. The shaft 219 at its inner end carries a horizontal arm 226, the free end of which lies in the path of movement of the pin 225 so that the arm will be depressed and the shaft 219 rocked whenever the pin passes over the end of arm, thereby moving arm 218 forward to engage against rod 217 with a consequent movement of the collar 213 and a movement of the splined disk 212 into frictional driving engagement with the loose continuously driven disk 209, shaft 206 thereupon being rotated with a driving of the shaft 223 therefrom.

Short arms or ears 227 project from the shaft 171, to which the lower end of the link bar 228 is pivotally connected, at its upper end having a pivotal connection to an arm 229 which lies at one side of the ratchet wheel 224 and is loosely mounted on the shaft 223. A dog 230 is pivotally connected to the arm 229 and is in engagement with the ratchet wheel. On rocking the shaft 171 back and forth, the dog serves to give a step by step movement to the ratchet wheel whereby eventually pin 225 comes to an arm 226 and depresses the same, causing a drive of the shaft 223 for the time pin 225 is over the end of the arm 226. This time is the time required for one length of cloth to be cut, marked and folded. As soon as the pin passes by the end of arm 226, the drive of the shaft 223 is stopped until the ratchet wheel has again been moved through a revolution to again bring the pin to the arm 226. A retaining dog 230$^a$ is associated with the ratchet wheel to preclude back movement.

A sprocket wheel 231 is pinned to the shaft 223 and turns therewith. An endless sprocket chain passes around the wheel 231 and also around a second sprocket wheel 233 secured at the end of a shaft 234 mounted horizontally in brackets 235 at the lower front side of the frame of the machine. A roller 236 is secured on the shaft around which a number of conveyer belts 237 pass, the same extending upwardly and to the front and positioned so as to have the folded lengths of cloth B deposited thereon by the fingers 172, as in Fig. 15. Several of the folded are deposited while the belts are at rest, and when shaft 223 is rotated, this bundle of lengths of cloth is carried out of the way by the belts so that the succeeding length of cloth is deposited on a different portion of the belts behind the preceding bundle. The bundles of folded lengths of cloth, when moved outward may be tied and placed in a truck for conveyance to the sewing machines where the lengths of cloth are sewed across on the marked lines 103$^a$ to make the pockets for the reception of the coiled springs, as before outlined.

A chain 238 passes around the sprocket wheel 196 heretofore described and extends downwardly and to the rear, passing around a second sprocket wheel 239 fixed on the end of a shaft 240 rotatably mounted at its ends in posts 241 carried by the sides 1 and 2 of the frame. At its opposite end, shaft 240 has a crank 242 attached thereto with which a connecting rod 243 is secured at one end (see Fig. 6), the rod extending forwardly to and having connection to a member 244 at its lower end, which is pivotally connected at its upper end at 245 to the outer side of the end 9 of the cutting mechanism casing. Projecting fingers 246 extending in opposite directions are secured at the lower end of the member 244.

Two parallel spaced apart rods 247 and 248 are located alongside the said end 9 of the casing and slidably mounted in vertically positioned guides 249, one at the front and one at the rear edge of the end 9. The rods are secured together near their ends by connecting blocks 250, as shown. A lever 252 is pivotally connected to the upper end of each guide 249 and each on its under side carries a block 251 adapted to interpose in the path of movement of the block 250 when the lever is in lower position as shown at the right in Fig. 6.

A yoke 253 is connected with the double clutch member 24 on the shaft 23, extending outwardly through the end 9 of the casing and terminating in a sleeve 254 which is fixed on the rod 248 to move therewith. A supporting bracket 255 is carried on the upper side 7 of the casing below the rod 248 on which two solenoids 256 are mounted, the cores thereof being formed with heads 257 at the adjacent ends of the solenoid windings. A lever 258 is pivotally mounted at its lower end on the bracket 255 at 259 and the same passes upwardly between the heads 257 and thence to the rod 248, having a yoke formed at its upper end to embrace the rod and passing beween two spaced apart collars 260 fixed on the rod 248.

Figure 8:
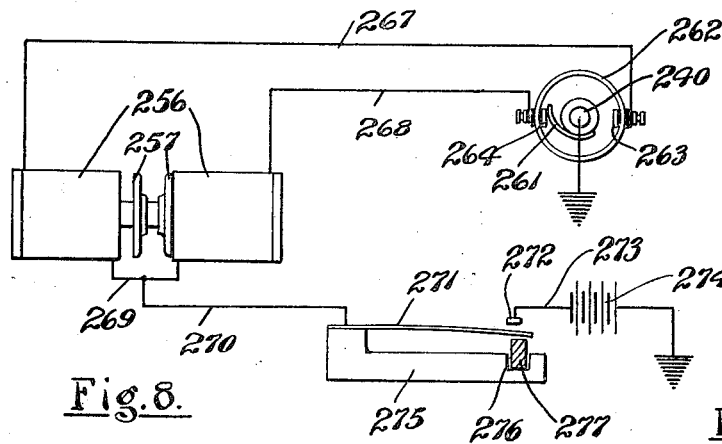
Fig. 8 is a diagrammatic outline of the electric circuit and means used for controlling the reversing means.

A brush 261 is secured to the shaft 240 to move in a timer casing 262 which carries two insulated contacts 263 and 264 at opposite sides of the casing, the brush alternately contacting therewith (see Fig. 8). Wires 267 and 268 lead from the two contacts 263 and 264 to the outer ends of the solenoid windings 256, and the inner ends of the windings are joined by a wire 269, from which a wire 270 leads to a spring member 271 mounted in a switch casing 275, diagrammatically shown in Fig. 8, and structurally shown in Fig. 1. The member 271 is located at its free end adjacent a contact 272 from which a wire 273 leads to one pole of an electric battery or other source of electricity 274, the opposite pole of the battery being connected with a suitable ground, which may be the frame of the machine, with which shaft 240 has ground connection. With this electric circuit and with the shaft 240 rotating continuously, the solenoids are alernately energized with the result that the core thereof is reciprocated and clutch 24 moved from one engaging position with one of the clutch members 25 to engaging position with the other. This results in the periodic reversal of movement of the rotation of shaft 28, as heretofore mentioned. The rocking of member 244 and the fingers 246 connected therewith serves to alternately actuate and lift the levers 252 from locking position to unlocking position and vice versa. In fact this reversing control means is a modification and improvement over that shown in my prior patent to which reference has been made, and has practically the same results.

The parts 271 and 272 normally would be out of contact if the parts were in the position diagrammatically indicated in Fig. 8, and the circuits be broken. This is the position the parts occupy when the belt 17 is on the loose pulley. The handle 19ª of the shifting rod 19 may have an extension 277 leading through a slot in the side of the case 275 in which the contact members 271 and 272 are mounted, the part 277 being received in a notch 276 in the side of the case when the belt is on the loose pulley, it being necessary to tilt or otherwise move the handle so that part 277 is lifted out of the notch before the belt is shifted to the fixed shaft driving pulley. When this is done, spring member 277 is raised into contact engagement with the contact 272 for completing the break in the circuits at this point, and the movement of the handle carries the part 277 away from the notch 276 so that said break in the circuits is closed at all times when the machine is running.

As a minor feature of the construction of the machine, I have provided brake members to bear against the rolls of cloth 13, a rod 278 being vertically mounted in brackets 279 on which brake bearing members 280 are mounted to bear against the rolls of cloth, spring actuated by the springs 281, as shown in Fig. 4, following the roll as it diminishes in size.

With this construction of machine as described, the cloth is drawn by the rollers 29, 30, 36 and 37 from the rolls of cloth 13 at high speed, is folded longitudinally and periodically marked by the marking members 146, once for each length of cloth cut, as the marking roller 145 is controlled to make on revolution with each revolution of the shaft 66. The cloth is transversely marked by the member 103 at equally spaced apart distances, the markings being controlled by the notches in the cams 89 which cams turn through one revolution with each revolution of the shaft 66. The cutting knife 46 operates once with each revolution of the shaft 66 so that the cut, indicated at C, Fig. 27, comes at the proper position at the end of a transversely marked length of cloth and between the two transverse markings controlled by the relatively closely positioned notches 95ª in the cams or disks 89. The throw-out fingers 172 are operated once with each revolution of the shaft 66 so that each cut length of cloth, folded on the rims 167 is removed to make place for the succeeding length. The relative ratio of the wheels 173 and 239, coupled with the electrical timer controls the number of transverse folds in a length of cloth deposited on the rims 167, and this folding, controlled by the reversal of movement of the shaft 28 may be adjusted through a change of position of the timer casing 262, a member 265 having a slotted lower end being associated with an arm 266 extending from the timer casing which has a limited adjustable connection with the member 265, as shown in Fig. 1. In fact most of the automatic control means is directly controlled by the shaft 66, one revolution of which occurs with each cycle of operations of the machine, with the exception of the actuation of the conveyer belts 237. The rollers 29, 30, 36 and 37 have a constant movement, and the relation of the speed of movement of the shaft 66 thereto may be changed by different change gears 73 and 74 used, to govern the lengths of cloth cut. The adjustment of the dogs 97 to any of the desired disks 89 governs the widths of the pockets. The lengths of cloth come from the machine cut to the right length, transversely marked where the cross seams are to be sewed, and with marking indications signifying the number of pockets in a length, the gage of the wire springs to be used therein, the width of the pockets or diameter of the springs to go therein, and the depth of the pockets, so that in subsequent operations in the factory, all necessary indicia are present. And the machine is very quickly adjusted to run a different order at any time when one order has been filled, merely changing the change gears 73 and 74, the marking members 146, and the positions of the dogs 97, with an operation of the shafts 118 and 118ª to properly position the shaft 122 substantially half way between the upper and lower ends of the cloth rolls 13. The machine is complete and practical in every respect and has been used extensively in spring factories with exceptionally satisfactory results, giving large quantity production with a minimum of labor cost.

The invention is defined in the appended claims and is to be considered as comprehensive of all forms of structure coming within their scope.

I claim:

1. In a machine of the class described, cloth drawing rolls for drawing cloth downwardly therethrough, cutting means mounted adjacent the rolls, means for periodically operating the cutting means to transversely cut the cloth, means rotatably mounted below the rolls on to which the cloth is delivered, and means for moving said last mentioned means back and forth whereby the cloth delivered thereto is folded in a plurality of folds.

2. In a machine of the class described, cloth engaging rolls for drawing cloth downwardly therethrough, cutting means mounted adjacent the rolls, means for periodically operating the cutting means to transversely cut the cloth into predetermined lengths, movably mounted means below the rolls to which the cloth is delivered, and means to move said movably mounted means back and forth under the rolls whereby the lengths of cloth delivered thereto are folded into a plurality of folds.

3. In a machine of the class described, the combination of elements defined in claim 2, combined with means for removing each folded length of cloth from said movably mounted means after deposit thereon and prior to the depositing of a succeeding length of cloth thereon, substantially as described.

4. In a machine of the class described, a horizontal rotatably mounted shaft, means attached thereto onto which cloth may be deposited, means for carrying lengths of cloth to said first means at substantially continuous speed, means for driving the shaft, means for periodically changing the direction of movement of said driving means to thereby reverse the direction of movement of the shaft, attached means to fold the lengths of cloth into a plurality of folds, and means for removing each folded length of cloth from said means attached to the shaft prior to the deposit of a succeeding length of cloth thereon.

5. In a machine of the class described, a horizontally located and rotatably mounted shaft, a plurality of spaced apart circular members mounted thereon, cloth drawing means for carrying lengths of cloth to the upper sides of said circular members, means for driving the shaft and periodically reversing its direction of movement whereby lengths of cloth carried thereto are folded into a plurality of folds, and throw-out means located in the spaces between the said circular members and over which the folded lengths of cloth are located adapted to remove each folded length prior to the depositing of a succeeding length.

6. In a machine of the class described, a horizontally located and rotatably mounted shaft, a plurality of spaced apart members having curved outer edges mounted on the shaft, means mounted above said members for drawing cloth, cutting it into predetermined lengths and delivering it to the members to lie thereon, means for alternately rotating the shaft in opposite directions whereby the lengths of cloth carried to said members are folded into a plurality of folds, a rock shaft mounted below the first shaft, a plurality of curved fingers attached thereto and adapted to lie in the spaces between said members on the first shaft, and means for periodically rocking the shaft to move said fingers outwardly to remove the folded lengths of cloth successively.

7. A construction containing the elements defined in claim 6, combined with a conveyer located in position to receive the folded lengths of cloth from said fingers, and means for periodically operating the conveyer after a predetermined number of said folded lengths have been deposited thereon.

8. In a machine of the class described, means for drawing cloth lengthwise from a roll of cloth and cutting it transversely into predetermined lengths, means to which said lengths of cloth are delivered operable to fold the same into a plurality of folds, said last named means being movable back and forth under the first means, and means for removing each folded length of cloth from said second mentioned means at the completion of its folding, substantially as described.

9. In a machine of the class described, a support for a roll of cloth, means for drawing the cloth continuously from the roll, means for longitudinally folding the cloth substantially midway between its edges at a point between the support and drawing means, means for cutting the cloth into predetermined lengths, means for changing the lengths to be cut, and means for marking one side of each length transversely at spaced apart points, substantially as described.

10. In a machine of the class described, means for supporting a roll of cloth, means for drawing the cloth continuously from the roll, means for longitudinally folding the cloth substantially midway between its edges at a point between the supporting and drawing means, means for cutting the cloth into equal predetermined lengths, means for transversely marking the lengths of cloth at spaced apart points, means for changing the machine to cut different lengths, and means for changing the machine to change the distances apart of said transverse markings on the cloth, substantially as described.

11. In a machine of the class described, rollers for drawing a continuous length of cloth therethrough, a rotatably mounted shaft, means for driving the same at different speeds with respect to a constant speed of rotation of the rollers, disks on the shaft, marking means for transversely marking the cloth controlled in its movements by said disks, cutting means normally inoperative for cutting the cloth into predetermined lengths, means rendered operative once with each rotation of the shaft for making the cutting means operative, a reversely moving member to which the lengths of cloth are delivered, a shaft for driving said means for reversing the movement of said last named shaft controlled by the rotation of the first shaft, and additional marking means for the cloth normally held in inoperative position and released for operation once with each rotation of the shaft.

12. In a machine of the class described, rollers for drawing a length of cloth therethrough, a shaft on which one of the rollers is rotatably mounted, a gear on one end of said shaft, means for periodically reversing the rotatative movement of the shaft, a second shaft rotatably mounted below the first shaft, a gear thereon in mesh with the first gear, means having curved outer surfaces attached to the second shaft and movable back and forth therewith under the rollers, and means for cutting the cloth into predetermined lengths.

13. In a machine of the class described, rollers for drawing a length of cloth therethrough, a shaft on which one of the rollers is rotatably mounted, a gear on one end of the shaft, means for periodically reversing the rotative movement of the shaft, a second shaft rotatably mounted below the first shaft, a gear thereon in mesh with the first gear, means having curved outer surfaces attached to the second shaft in spaced apart relation, a third shaft mounted below the second shaft, a plurality of fingers on the third shaft adapted to pass between said spaced apart means on the second shaft, a combined gear and clutch member on the third shaft, the gear being in mesh with the second gear, a clutch member fixed to the third shaft, means normally tending to move the clutch members into engagement, means holding the same from engagement, and means to periodically release the holding means to permit the engagement of the clutch members and thereafter separate the same, substantially as described.

14. In a machine of the class described, rollers for drawing a length of cloth therethrough, a shaft on which one of the rollers is rotatably mounted, a gear on one end of the shaft, means for periodically reversing the rotative movement of the shaft, a second shaft rotatably mounted below the first shaft, spaced apart members having curved outer surfaces mounted on the second shaft, said members at their upper sides lying directly below the rollers, a gear on the second shaft in mesh with the first gear, a third shaft mounted below the second shaft, curved fingers mounted on the third shaft in spaced apart relation and adapted to enter the spaces between the said members on the second shaft, and means to periodically connect the third shaft with the gear on the second shaft to rotate said third shaft to move the fingers thereon outwardly, said means disconnecting after the fingers have been moved forward a predetermined distance, substantially as described.

15. A construction containing the elements in combination defined in claim 14, combined with means normally tending to hold the fingers back in place between said members on the second shaft, and acting to return them to said position on disconnection of the means operating to move them outwardly.

16. A construction containing the elements in combination defined in claim 14, combined with arms attached to the third shaft, and weights on the arms tending to overbalance the fingers and hold them back in position between said members on the second shaft.

17. In a machine of the class described, rollers for drawing cloth therethrough, a shaft driven by one of said rollers, transverse cloth marking means operated a plurality of times by means on said rollers with each rotation of the shaft, cloth cutting means controlled for a single operation with each rotation of the shaft, a reciprocable member to which the cloth is delivered operated back and forth a plurality of times with each rotation of the shaft and controlled as to reciprocation by the shaft, additional marking means operated once with each rotation of the shaft and controlled thereby, and throw-out means associated with said reciprocable member to operate once with each rotation of said shaft.

18. In a machine of the class described, containing the elements in combination defined in claim 17, of means for driving the said shaft at different speeds of rotation with respect to a constant speed of rotation of the rollers.

19. In a machine of the class described, a relatively fixed vertical spindle on which a roll of cloth is adapted to be mounted, a support located horizontally and mounted for vertical movements in front of the spindle, a roller mounted horizontally on said support, means for vertically adjusting said support, rollers for drawing cloth from the roll of cloth over said first named horizontal roller, and means mounted on said support for longitudinally folding the cloth substantially midway between its edges and changing it from vertical position in the roll to horizontal position to pass over the first roller.

20. In a machine of the class described, rollers for drawing a length of cloth therethrough, a casing enclosing the rollers, a shaft on which one of the rollers is rotatably mounted, a shaft mounted in the casing at one end of the first shaft, means to continuously drive the second shaft, a two-faced clutch member splined on the second shaft, two combined bevelled gear and clutch members loose on the second shaft, a bevelled gear on the end of the first shaft in mesh with both gears on the second shaft, a yoke associated with the two-faced clutch member, a rod slidably mounted on the end of the casing with which said yoke has connection, solenoids located adjacent the rod, connections between the solenoid cores and said rod for moving the rod in different directions on energizing the solenoids, an electric circuit including the solenoid windings, means for automatically alternately energizing the solenoids by alternately closing the circuits thereof, a gear at the opposite end of the first shaft, a third shaft mounted below the first shaft, a gear thereon in mesh with the last mentioned gear on the first shaft, and members having curved outer surfaces attached to the third shaft and located under the said rollers.

21. In a machine of the class described, rollers for drawing a length of cloth therethrough, a shaft on which one of the rollers is loosely mounted, reversing gearing connections at one end of the shaft, means for driving the shaft and said connections, solenoids for moving the reversing gearing connections in opposite directions, electric circuits including the solenoids, means for alternately completing and breaking said circuits, a shaft located below the first shaft, gearing connections between the first and second shafts, and members having curved outer surfaces connected to the second shaft and located below the rollers.

22. In a machine of the class described, means for drawing a length of cloth therethrough, a rotatably mounted shaft, means for alternately reversing the direction of movement of said shaft, including reversing mechanism operated alternately in opposite directions, a pair of solenoids, the cores of which are connected with said reversing mechanism to operate the same, two electric circuits in which the solenoids are included, a rotary contact member, contacts alternately engaged thereby to alternately close the circuits, and means for rotating the rotary contact member.

23. In a machine of the class described, including the elements in combination defined in claim 22, the combination therewith of a second shaft located below and paralleling the first shaft, gearing connection between the shafts, members having curved outer sides attached to the second shaft and located to receive the cloth, a third shaft, marking means operated by the rotation of the third shaft to transversely mark the cloth as it passes, and means to drive the rotary contact member from said third shaft.

24. In a machine of the class described, means to draw cloth in a continuous length from a roll of cloth, means for transversely marking the cloth at spaced apart intervals as it passes a given point in its movement, means for cutting the cloth into predetermined lengths, means for additionally marking each length of cloth at one point, movable means to which the cloth is delivered, means to move said means back and forth whereby the cloth is folded into a plurality of folds, a conveyer, and means to remove each folded length of cloth from said movable means to the conveyer, substantially as described.

25. In a machine of the class described, means to draw cloth in a continuous length from a roll of cloth, means for folding said cloth longitudinally at a line substantially midway between the edges of the cloth, means for transversely marking the cloth on one side at spaced apart points as it passes a given point, means for cutting the cloth into predetermined lengths, means to which the cloth is delivered, means for moving said last mentioned means back and forth whereby the cloth delivered thereto is folded into a plurality of folds, and means for removing each folded length of cloth from said means prior to the folding of a succeeding length of cloth thereon.

26. A construction containing the elements in combination defined in claim 24, combined with means for operating the conveyer at periodic intervals after a number of the folded lengths of cloth have been placed thereon one over the other.

In testimony whereof I affix my signature.

HARRY A. SHIELDS.